J. J. FISHER.
AUTOMOBILE PULLER.
APPLICATION FILED OCT. 2, 1914.
1,147,495.
Patented July 20, 1915.
2 SHEETS—SHEET 1.
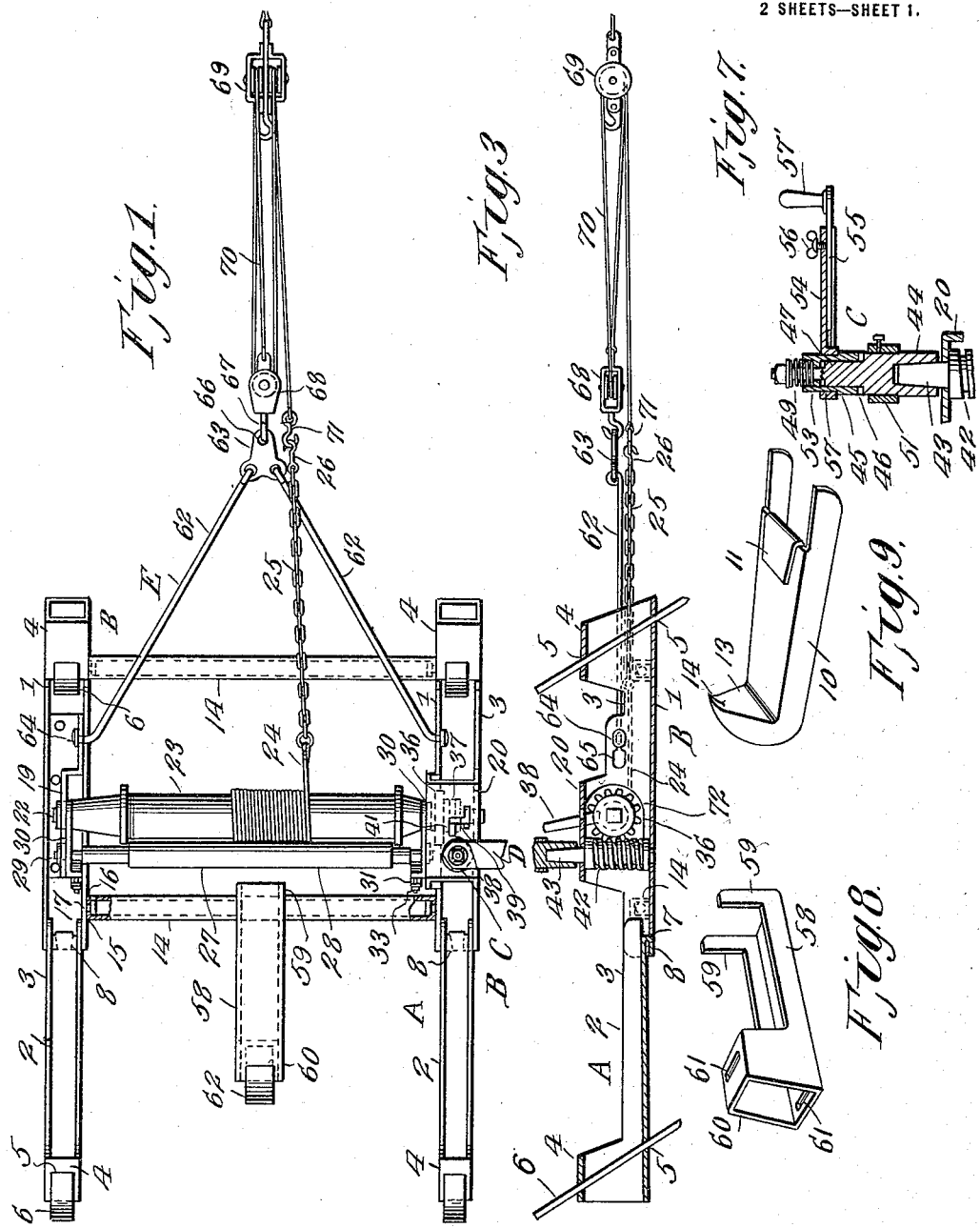
Witnesses
Frank Hough.
R. M. Smith.
Inventor
James J. Fisher,
By Victor J. Evans
Attorney

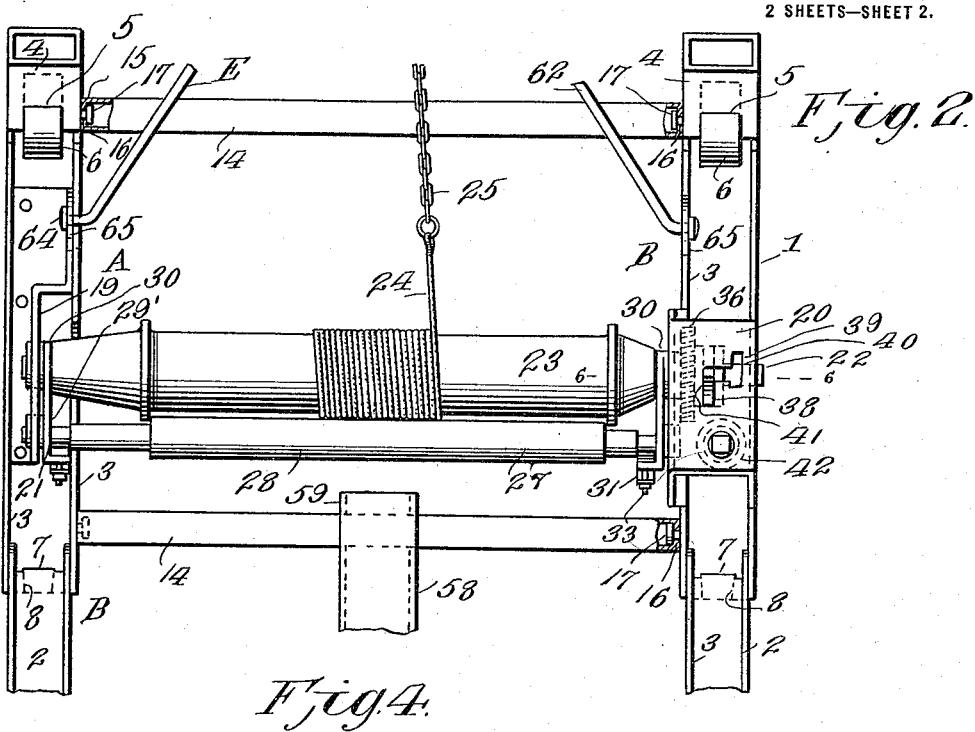

UNITED STATES PATENT OFFICE.

JAMES J. FISHER, OF TOWNSEND, MONTANA.

AUTOMOBILE-PULLER.

1,147,495.   Specification of Letters Patent.   Patented July 20, 1915.

Application filed October 2, 1914. Serial No. 864,660.

*To all whom it may concern:*

Be it known that I, JAMES J. FISHER, a citizen of the United States, residing at Townsend, in the county of Broadwater and State of Montana, have invented new and useful Improvements in Automobile-Pullers, of which the following is a specification.

This invention relates to automobile pullers, the object of the invention being to provide portable and sectional apparatus adapted to be carried in an automobile or motor vehicle of any kind and readily assembled at the place of operation to facilitate the extrication of a motor car from any place where it has become mired or where the traction of the wheels is insufficient to propel the machine out of bad places.

With the above general object in view, the invention consists in the novel construction, combination and arrangement of parts, as herein described, illustrated and claimed.

In the accompanying drawings:—Figure 1 is a plan view on a small scale showing the complete apparatus of this invention. Fig. 2 is an enlarged plan view of the puller frame and the parts intimately associated therewith. Fig. 3 is a vertical longitudinal section through one of the side bars showing the sectional construction thereof. Fig. 4 is a plan view of the drum and roller detached from the main frame. Fig. 5 is a fragmentary sectional view of the worm gearing. Fig. 6 is a similar view taken longitudinally of the squared end of the drum shaft showing the gear shifting means. Fig. 7 is a longitudinal section through the operating lever and ratchet device. Fig. 8 is a detail perspective view of the auxiliary central anchoring device. Fig. 9 is a similar view of a railway tie engaging anchor.

The apparatus hereinafter described in detail is in the nature of an improvement upon the construction illustrated and described in my prior Patent No. 1,091,318, dated March 24, 1914. The apparatus comprises a frame designated generally at A which frame is of sectional and knock-down construction. The frame comprises the oppositely arranged parallel side bars B each of which is of sectional construction, comprising a main forward section 1 and a rear section 2. Each of said sections is provided with opposite parallel strengthening flanges 3 and is also formed with a tubular end portion 4 provided in the top and bottom thereof with slots 5 extending transversely of the top and bottom walls of the tubular portions and arranged out of vertical alinement with each other to receive flat sided spikes 6 which are driven through said slots into the ground for the purpose of securely anchoring the frame preparatory to operating upon a motor car, the spikes being inclined so as to retain themselves in the ground as the pulling connections are strained for the purpose of extricating the motor car from its position.

The section 2 of each side bar is detachably connected to the main section 1 by providing the section 1 adjacent to the rear end thereof with a transverse slot 7 and providing the section 2 with a recurved portion 8 forming a hook which is inserted through the slot 7. The section 2 is used where the frame is to be anchored to the ground but where the frame is to be anchored to a rail or tie of a railway, I employ the anchoring devices illustrated in Fig. 9, each of said anchoring devices comprising a flat body portion 9, oppositely arranged strengthening flanges 10, a hook 11 adapted to be inserted through the slot in the rear end of the section 1, and a downwardly extending hook or fluke 13 having a pointed extremity 14 adapted to hook under the head of a rail or back of a railway tie. The anchoring devices just described are particularly useful when the device as a whole is used for pulling railway cars along a railway.

The side bars B are connected by cross bars 14 of channel iron formation having end walls 15 formed with slots 16 to fit over headed studs 17 on the adjacent sides of the side bars B. The construction shown and described provides for readily connecting and disconnecting the side and cross bars of the frame. One of the side bars B is provided with an upstanding flange 19 and the other side bar is provided with an upstanding housing 20, the said parts 19 and 20 being provided with bearing openings 21 for the opposite extremities of the shaft 22 of a winding drum 23. A flexible cable 24 is wound upon this drum and provided at the extremity thereof with a chain 25 having a terminal hook 26, said chain and hook being adapted to be passed around any convenient part of a motor car preparatory to operating the apparatus.

Parallel to the drum 23 is a roller 27 having a rubber covered portion 28 which cooperates with the flexible cable to guide the same evenly upon the drum 23. The shaft 29 of said roller has its ends journaled in slots 29 in the flange 19 and housing 20 to allow for the movement of said roller toward and away from the face of the drum. The shafts of the drum and roller are connected by links 30 formed with openings to receive the shaft of the drum and slots to receive the shaft of the roller. Each of said links also carries a spring 31 which acts to press the roller toward the drum, said spring having an eye 32 which receives a tension bolt 33 by means of which the tension of the spring may be increased or diminished to give greater or less pressure to the roller in relation to the cable wound around the drum 23.

The end of the drum shaft which is received in the housing 20 is non-circular in cross section being shown for convenience as squared at 35. Upon the squared portion of the drum shaft is a worm gear 36 having a grooved head which receives a shifting lever or fork 37. The handle 38 of said lever or fork extends upwardly through the top wall of the housing 20 which top wall is provided with a slot 39 having a T extension 40 at one end and an L extension 41 at the other end. By means of said lever the worm gear 36 may be slid along the squared portion of the shaft so as to draw the same into and out of engagement with a driving worm 42 the shaft 43 of which extends vertically and is journaled in the housing 20. When the lever handle 38 is in line with the portion 40 of the slot, the gears are in mesh and when said lever handle is in the extension 41 of the slot, the gears are out of mesh, the latter position enabling the drum to turn freely for the purpose of permitting the cable to be unwound therefrom and fastened to a motor car.

The upper end of the shaft 43 is squared to receive a ratchet head designated generally at C and comprising a lower section 44 which is removably fitted over the squared end of the shaft 43, said ratchet head also comprising an upper section 45 and both sections having coöperating ratchet teeth 46, the upper section 45 being slidable on a reduced stem or shank 47 of the lower section 16 and the ratchet teeth 46 being held in coöperative relation to each other by means of a coiled spring 49 the tension of which is adjustable by a nut 50.

51 designates a sliding collar having a non-circular opening therein to fit the adjacent ends of the sections 44 and 45 of the ratchet head so as to lock said sections together when the ratchet action of the members 44 and 45 is not required.

The upper end of the section 45 is squared as shown at 53 to receive a lever arm designated generally at D, said lever arm embodying the two relatively slidable telescopic sections 54 and 55 adapted to be held in their adjusted relation by means of a binding screw 56. The inner section of the lever is provided with a square opening 57 to fit the upper end of the ratchet head while the other lever section 55 has an operating handle 57 at its outer extremity.

In some cases it may be found desirable to employ an auxiliary anchoring device shown at 58 the same comprising a flanged body provided at one end with hooks 59 adapted to be placed over the rear cross bar 14 of the main frame and also provided at its opposite end with a tubular portion 60 formed with slots 61 arranged out of alinement with each other and adapted to have a spike 62 driven through the same into the ground. One or more of these auxiliary anchoring devices 58 may be employed as may be found necessary at the time and in accordance with the nature of the ground at the place where the apparatus is used.

Where the motor car is badly mired and additional power is required to extricate the same from its position, I provide a bridle E comprising the two forwardly converging rods 62 connected at their convergent ends to a clevis 63. The opposite ends of said rods are bent laterally and provided with heads 64 which are removably inserted through key hole slots 65 in the flange 19 and housing 20 of the side bars B. The clevis 63 is provided with a hole 66 to receive the hook 67 of a pulley block 68 forming part of a block and tackle, the latter comprising an additional pulley block 69 and cable 70 one end of which is attached to the first named pulley block and the other extremity of which is provided with a hook 71 adapted to be connected to the hook 26 above referred to. In the operation of this part of the mechanism, the block and tackle device is connected to the automobile or motor car after which the hook at the end of the pulling cable is connected to the block and tackle in the manner just stated. The drum shaft is then operated by the hand lever above described thereby obtaining a powerful leverage to extricate the machine from its position. Ordinarily, however, the block and tackle mechanism may be dispensed with and the cable run directly to the machine to be operated upon.

The housing 20 is formed in the inner side thereof with an enlarged orifice 72 of sufficient size to admit the worm gear and its shifting lever or fork to facilitate the assembling and knocking down of the frame and other parts of the apparatus. By means of the construction described, the side bars and cross bars may be readily disconnected and assembled and the side bars B may also be separated as to the sections thereof. The drum and cable guiding roller are together detachable from the frame and held in proper relation to each other by the end links. The ratchet head is detachable from the worm shaft 43 and the hand lever is detachable from the ratchet head. Thus it will be seen that the parts of the entire structure may be readily assembled and disconnected, enabling the entire apparatus to be stored compactly in an automobile or motor car.

What I claim is:—

1. In an automobile puller, a sectional and portable base frame, means for anchoring said frame, a flexible pulling cable, a drum on which said cable is wound having a horizontal shaft journaled in opposite frame members and embodying a non-circular end portion, a worm wheel having an opening therein corresponding to the shape of said end portion of the drum shaft and slidable thereon, a worm meshing with said wheel and having a vertical shaft journaled in one of the frame members, means for shifting said worm wheel into and out of engagement with said worm, and means for turning said worm shaft.

2. In an automobile puller, a sectional and portable base frame, means for anchoring said frame, a flexible pulling cable, a drum on which said cable is wound having a horizontal shaft journaled in opposite frame members and embodying a non-circular end portion, a worm wheel having an opening therein corresponding to the shape of said end portion of the drum shaft and slidable thereon, a worm meshing with said wheel and having a vertical shaft journaled in one of the frame members, means for shifting said worm wheel into and out of engagement with said worm, and means for turning said worm shaft, consisting of a lever having a backing ratchet.

3. In an automobile puller, a sectional and portable base frame, means for anchoring said frame, a flexible pulling cable, a drum on which said cable is wound having a horizontal shaft journaled in opposite frame members and embodying a non-circular end portion, a worm wheel having an opening therein corresponding to the shape of said end portion of the drum shaft and slidable thereon, a worm meshing with said wheel and having a vertical shaft journaled in one of the frame members, means for shifting said worm wheel into and out of engagement with said worm, means for turning said worm shaft, a cable guiding roller parallel to said drum, links connecting the shafts of the drum and roller, and springs acting to press the roller toward the drum.

4. In an automobile puller, a sectional and portable base frame, means for anchoring said frame, a flexible pulling cable, a drum on which said cable is wound having a horizontal shaft journaled in opposite frame members and embodying a non-circular end portion, a worm wheel having an opening therein corresponding to the shape of said end portion of the drum shaft and slidable thereon, a worm meshing with said wheel and having a vertical shaft journaled in one of the frame members, means for shifting said worm wheel into and out of engagement with said worm, means for turning said worm shaft, a bridle extending forwardly from said frame, and block and tackle mechanism adapted to be connected to an automobile and to be operated by said cable.

In testimony whereof I affix my signature in presence of two witnesses.

JAMES J. FISHER.

Witnesses:
 ROBT. N. JONES,
 ALMA BERQUIST.

Copies of this patent may be obtained for five cents each, by addressing the "Commissioner of Patents, Washington, D. C."